US 12,132,221 B2

United States Patent
Yashiro et al.

(10) Patent No.: US 12,132,221 B2
(45) Date of Patent: Oct. 29, 2024

(54) BATTERY PACK

(71) Applicant: HONDA MOTOR CO., LTD., Tokyo (JP)

(72) Inventors: Kenta Yashiro, Tokyo (JP); Toshiyuki Ikeuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/081,232

(22) Filed: Dec. 14, 2022

(65) Prior Publication Data

US 2023/0198085 A1   Jun. 22, 2023

(30) Foreign Application Priority Data

Dec. 17, 2021 (JP) .................. 2021-204816

(51) Int. Cl.
*H01M 50/325* (2021.01)
*H01M 50/367* (2021.01)

(52) U.S. Cl.
CPC ....... *H01M 50/325* (2021.01); *H01M 50/367* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 6,278,259 B1 * | 8/2001 | Kimoto | ............... | H01M 50/358 |
| | | | | 320/147 |
| 2014/0127537 A1 * | 5/2014 | Pflueger | .............. | H01M 50/147 |
| | | | | 429/50 |
| 2020/0235359 A1 * | 7/2020 | Hayashi | .............. | H01M 50/358 |
| 2021/0218077 A1 * | 7/2021 | Janarthanam | ....... | H01M 50/204 |
| 2021/0328281 A1 * | 10/2021 | Chu | ........................ | H01M 10/52 |
| 2022/0173478 A1 * | 6/2022 | Tokuda | ............... | H01M 50/249 |

FOREIGN PATENT DOCUMENTS

| | | | |
|---|---|---|---|
| CN | 111106278 A | | 5/2020 |
| JP | 2014-523090 A | | 9/2014 |
| JP | 2018-018726 A | | 2/2018 |
| JP | 2020-119649 A | | 8/2020 |
| WO | WO2020133629 | * | 7/2020 |

OTHER PUBLICATIONS

Sep. 5, 2023, translation of Japanese Office Action issued for related JP Application No. 2021-204816.
Sep. 5, 2023, Japanese Office Action issued for related JP Application No. 2021-204816.
Jul. 26, 2024, Translation of Chinese Office Action issued for related CN Application No. 202211644776.8.

* cited by examiner

*Primary Examiner* — Lisa S Park
(74) *Attorney, Agent, or Firm* — Paratus Law Group, PLLC (57) ABSTRACT

A battery pack includes a cell-stacked body in which a plurality of battery cells including gas release valves are stacked, a gas release duct which connects the gas release valves of the plurality of battery cells, and a battery case which accommodates the cell-stacked body and the gas release duct. The battery pack is capable of discharging a gas from the gas release duct to an outside of the battery case. A check valve configured to allow a flow of the gas from the gas release valves to the outside of the battery case and to restrict entry of a foreign matter from the outside of the battery case is provided in the battery case.

4 Claims, 7 Drawing Sheets

BATTERY PACK

CROSS-REFERENCE TO RELATED APPLICATIONS

This application is based on and claims priority under 35 USC 119 from Japanese Patent Application No. 2021-204816 filed on Dec. 17, 2021.

TECHNICAL FIELD

The present disclosure relates to a battery pack mounted on a vehicle or the like.

BACKGROUND ART

In recent years, as a specific measure against climate variation of the earth, efforts to realize a low-carbon society or a decarbonization society have been actively made. Also in vehicles, a reduction in $CO_2$ emission amount is strongly required, and a driving source is rapidly electrified. Specifically, a vehicle, such as an electrical vehicle or a hybrid electrical vehicle, which includes an electric motor as a driving source of the vehicle and a battery as a secondary battery which can supply electric power to the electric motor has been developed.

A battery pack including a cell-stacked body in which a plurality of battery cells are stacked is mounted on the vehicle. Such a battery pack is provided with a structure in which, when an internal pressure of a gas generated in a battery cell rises to a predetermined value or more due to some abnormality, the generated gas is released to an outside of the battery cell. Specifically, the battery cell includes a gas release valve. When the internal pressure of the gas generated in the battery cell rises to the predetermined value or more, the gas is released from the gas release valve to an outside of the battery pack via a duct.

A power supply device disclosed in JP-A-2018-018726 includes a battery block in which a plurality of unit cells including exhaust valves are stacked, a casing which accommodates the battery block, a discharge duct which is coupled to a discharge opening of the exhaust valve and is for discharging a gas generated in the unit cell to an outside, and a check valve coupled to the discharge duct via a gas tube. The check valve is opened such that the gas generated in the unit cell is discharged to the outside, and prevents backflow from the outside.

In the power supply device of JP-A-2018-018726, the check valve is disposed in a side sill of a vehicle. Further, a gas tube which connects the check valve and the battery block is not accommodated in the casing, and is exposed to an outside of the vehicle and an inside of the vehicle. Therefore, the exposed gas tube may be damaged. When the gas tube is broken, a foreign matter may enter the battery block without passing through the check valve.

SUMMARY

The present disclosure provides a battery pack which prevents a foreign matter from entering a battery cell from an outside.

According to an aspect of the present disclosure, there is provided a battery pack including: a cell-stacked body in which a plurality of battery cells including gas release valves are stacked; a gas release duct which connects the gas release valves of the plurality of battery cells; and a battery case which accommodates the cell-stacked body and the gas release duct, in which the battery pack is capable of discharging a gas from the gas release duct to an outside of the battery case, and in which a check valve configured to allow a flow of the gas from the gas release valves to the outside of the battery case and to restrict entry of a foreign matter from the outside of the battery case is provided in the battery case.

According to another aspect of the present disclosure, there is provided a battery pack including: a first battery module in which a plurality of battery cells including gas release valves are stacked along a first direction; a first gas release duct which connects the gas release valves of the plurality of battery cells in the first battery module; a second battery module in which a plurality of battery cells including gas release valves are stacked along the first direction; a second gas release duct which connects the gas release valves of the plurality of battery cells in the second battery module; and a battery case which accommodates the first battery module, the second battery module, the first gas release duct, and the second gas release duct, in which the battery pack is capable of discharging a gas from the first gas release duct and the second gas release duct to an outside of the battery case, and in which a check valve configured to allow a flow of the gas from the gas release valves to the outside of the battery case and to restrict entry of a foreign matter from the outside of the battery case is provided in the battery case.

According to the present disclosure, it is possible to prevent a foreign matter from entering a battery cell from an outside.

DESCRIPTION OF EMBODIMENTS

Hereinafter, an embodiment of a battery pack of the present disclosure will be described with reference to the accompanying drawings. In the present embodiment, the battery pack is mounted on a vehicle. The drawings are viewed in directions of reference numerals. Further, in the present specification and the like, in order to simplify and clarify description, front and rear, left and right, and upper and lower directions are described in accordance with directions viewed from a driver of the vehicle. In the drawings, a front side, a rear side, a left side, a right side, an upper side, and a lower side of the vehicle are denoted by Fr, Rr, L, R, U, and D, respectively.

<Vehicle>

Figure 1:
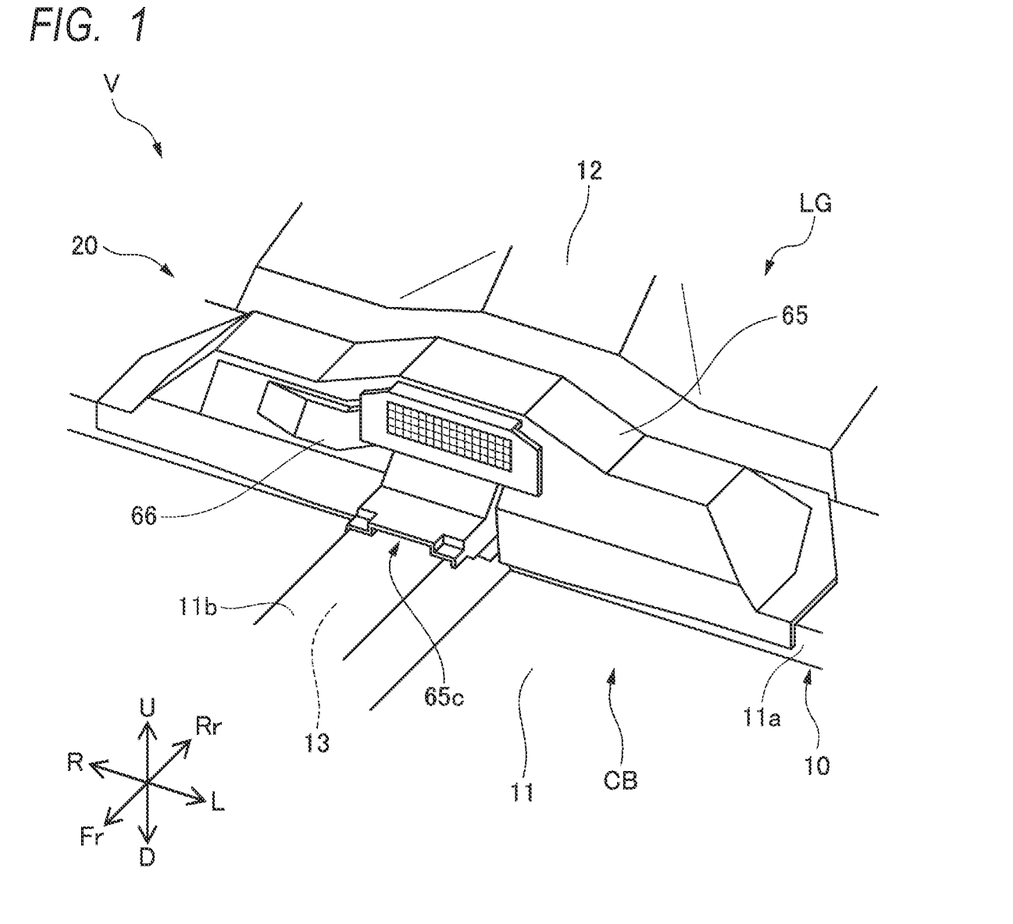
FIG. 1 is a perspective view of a periphery of a rear seat of a vehicle V on which a battery pack 20 is mounted when viewed obliquely from a front side and an upper side.
Figure 2:
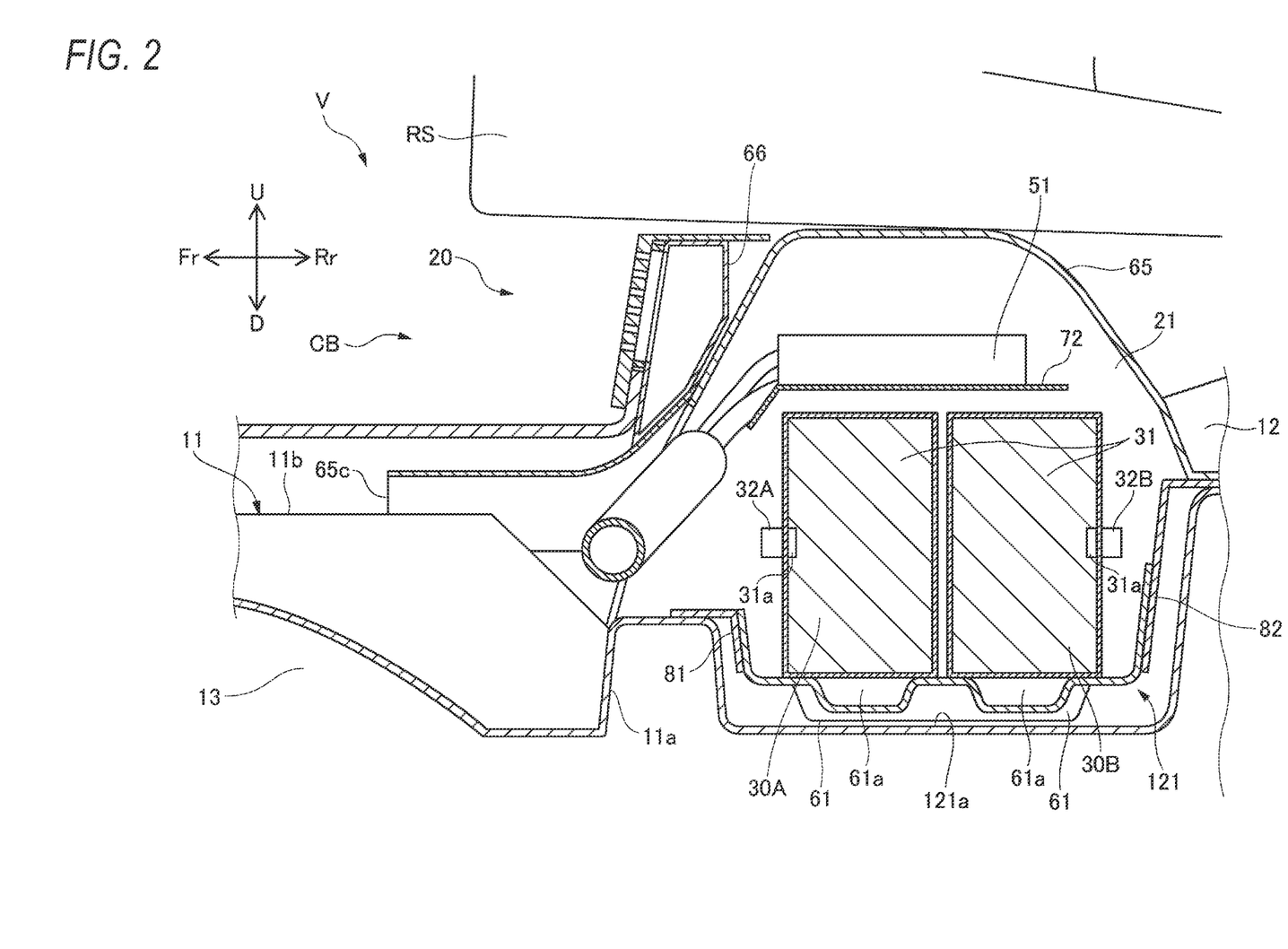
FIG. 2 is a cross-sectional view of a vicinity of the battery pack 20 of the vehicle V when viewed from a left side.

As illustrated in FIGS. 1 and 2, a battery pack 20 of the present embodiment is mounted on a vehicle V. The vehicle V is an electric vehicle such as a hybrid vehicle or an electrical vehicle, and is configured to travel by driving a motor with electric power stored in the battery pack 20. The battery pack 20 is placed on a floor panel 10 and fixed to the floor panel 10. A rear seat RS of the vehicle V is disposed above the battery pack 20.

The floor panel 10 includes a front floor panel 11 which constitutes a floor portion of a vehicle cabin CB, and a rear floor panel 12 which constitutes a floor portion or the like of a luggage compartment LG provided behind the vehicle cabin CB. The front floor panel 11 and the rear floor panel 12 are connected below the rear seat RS. Both end portions of the floor panel 10 in a vehicle width direction are coupled to a pair of left and right skeleton frame members (not illustrated) which extend along the front-rear direction. Accordingly, the floor panel 10 is fixed to the skeleton frame members.

A kick-up portion 11a which rises upward is formed at a rear end portion of the front floor panel 11. Further, a center tunnel 11b is formed along the front-rear direction at a central portion of the front floor panel 11 in the vehicle width direction. The center tunnel 11b is bent such that the front floor panel 11 protrudes upward, and a trapezoidal tunnel space 13 is formed below the center tunnel 11b.

A housing recessed portion 121 is recessed in a front end portion of the rear floor panel 12. The housing recessed portion 121 includes a rectangular bottom wall portion 121a which is long in the vehicle width direction. The battery pack 20 is placed on the bottom wall portion 121a.

<Overall Configuration of Battery Pack>

Figure 3:
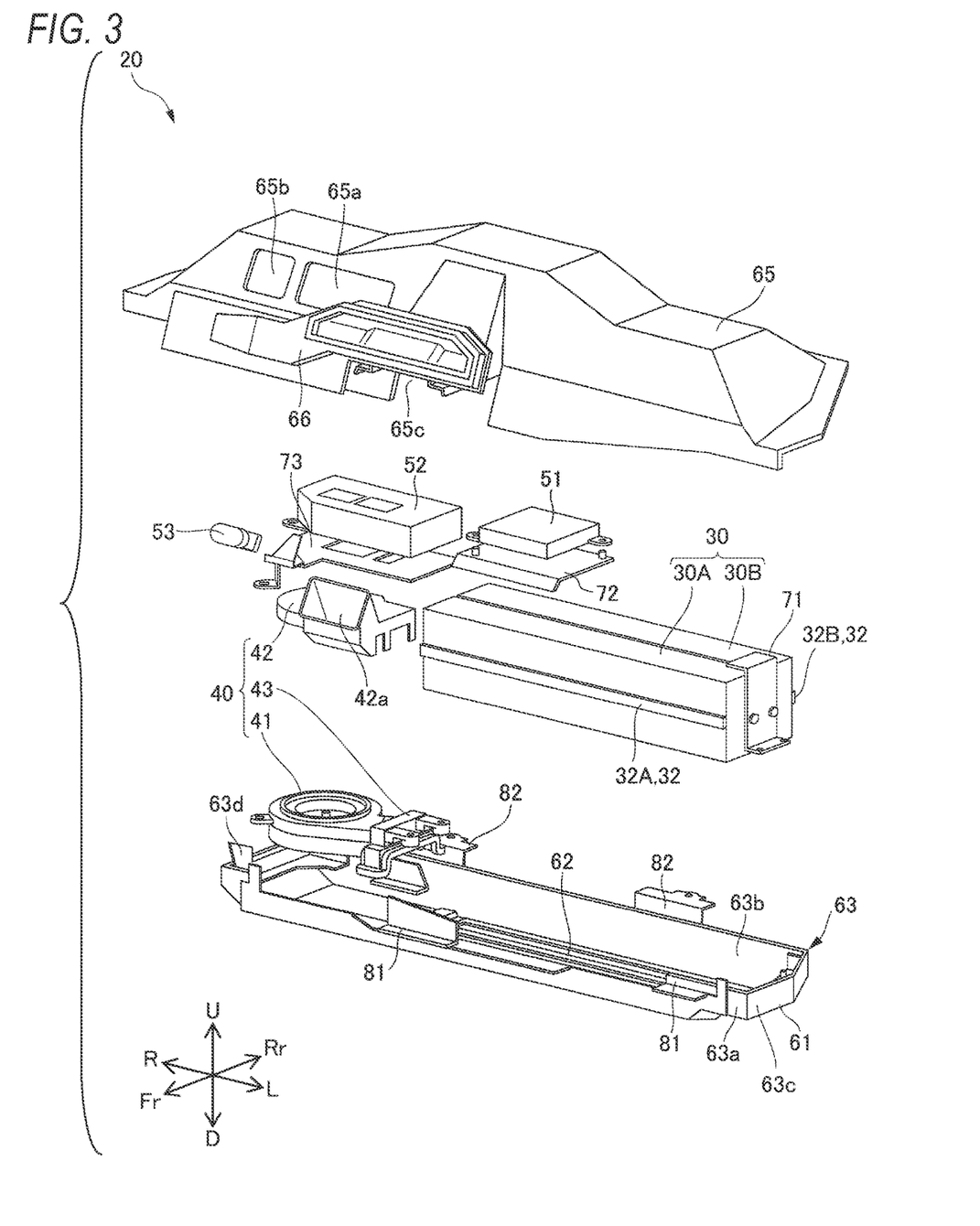
FIG. 3 is an exploded perspective view of the battery pack 20.
Figure 4:
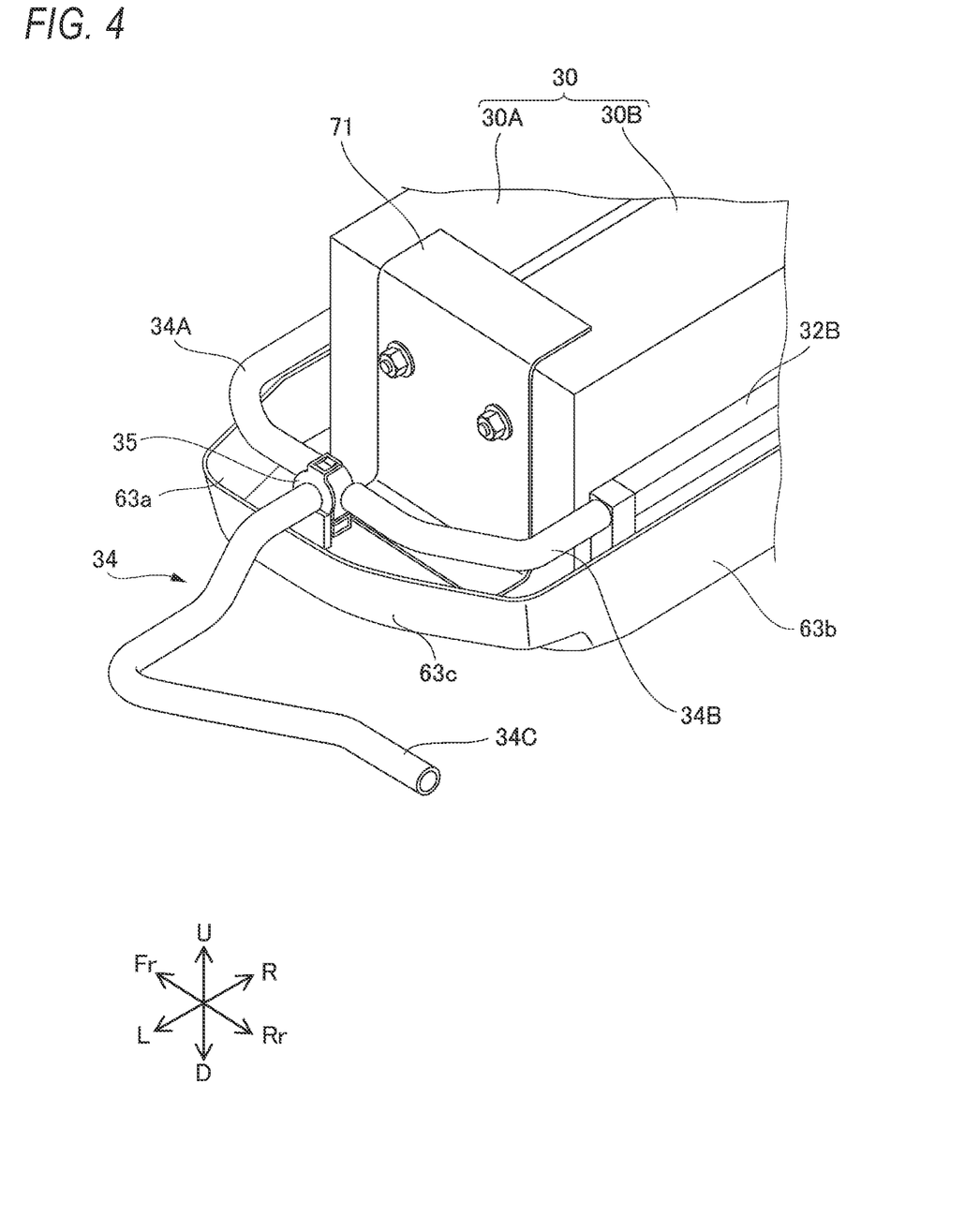
FIG. 4 is a perspective view of a gas discharge structure for discharging a gas generated in a battery cell 31 to an outside of a battery case 60 when viewed obliquely from a rear side and an upper side.
Figure 5:
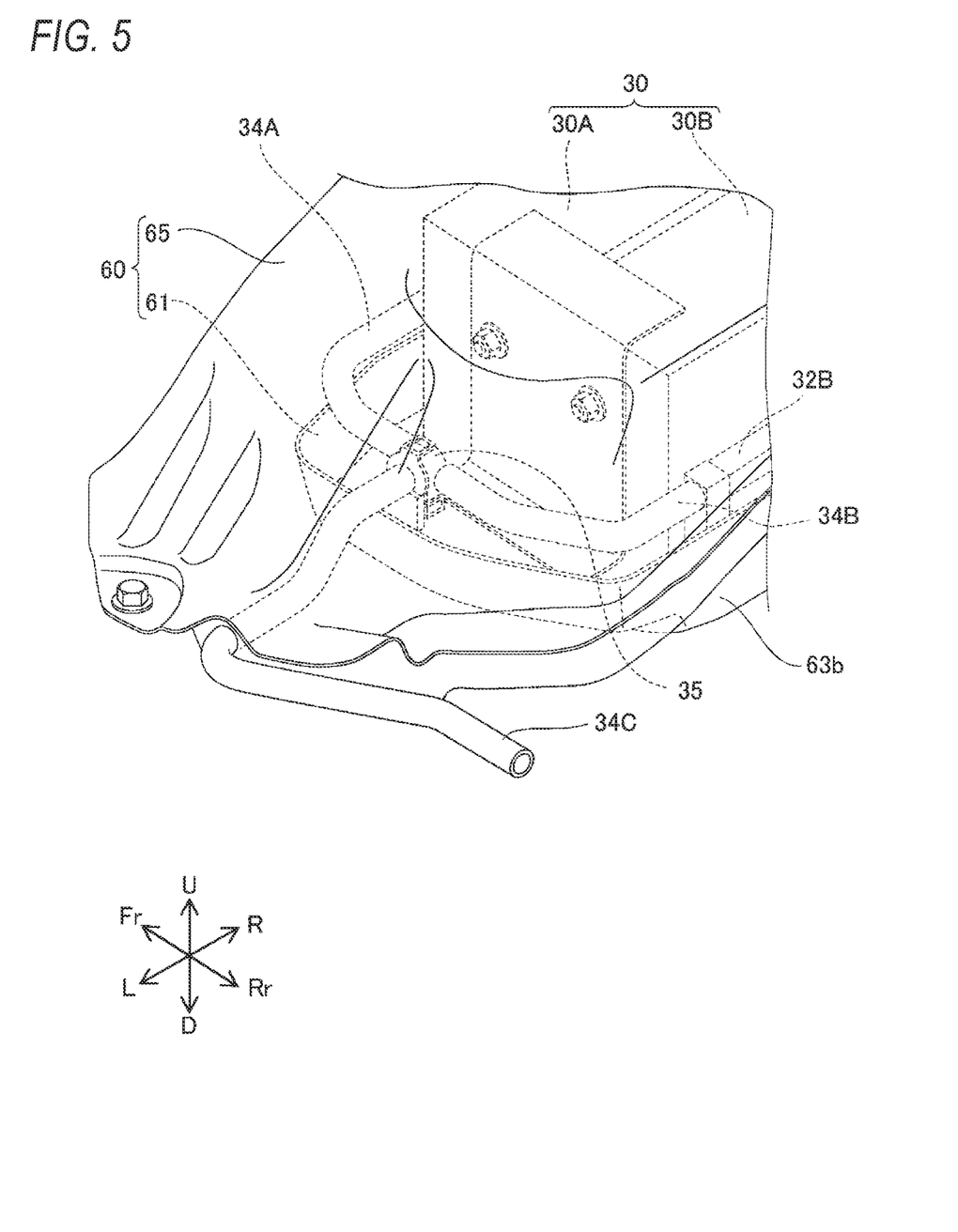
FIG. 5 is a diagram of a state where a cover 65 of the battery pack 20 is attached in FIG. 4.

As illustrated in FIGS. 1 to 3, the battery pack 20 includes a battery module 30, a cooling device 40 through which a cooling gas for cooling the battery module 30 flows, a battery control device 51 which controls charging and discharging of the battery module 30, a junction board 52 which electrically connects the battery module 30 and an external device (not illustrated) and is mounted with a wiring component through which charging electric power and discharging electric power of the battery module 30 flow, a service plug 53 which can cut off electric power flowing through the junction board 52, and a battery case 60 which accommodates these members. The battery case 60 includes a base plate 61 on which the battery module 30 and the cooling device 40 are placed, and a cover 65 which covers an upper side of the housing recessed portion 121. In FIG. 3, a gas discharge structure around the battery module described later is omitted except for a gas release duct 32.

The battery pack 20 includes front frames 81 and rear frames 82 fixed to the base plate 61. The front frame 81 is fixed to the kick-up portion 11a of the front floor panel 11, and the rear frame 82 is fixed to the front end portion of the rear floor panel 12 (see FIG. 2). The base plate 61 is placed on the bottom wall portion 121a of the housing recessed portion 121 recessed in the front end portion of the rear floor panel 12.

The base plate 61 includes a bottom wall portion 62 which covers lower sides of the battery module 30 and the cooling device 40 disposed on a right side of the battery module 30, and a side wall portion 63 which is bent upward from front, rear, left, and right outer edge portions of the bottom wall portion 62, surrounds the front, rear, left, and right outer edge portions of the bottom wall portion 62, and extends in the upper-lower direction. The side wall portion 63 includes a front wall portion 63a bent upward from a front edge portion of the bottom wall portion 62, a rear wall portion 63b bent upward from a rear edge portion of the bottom wall portion 62, a left wall portion 63c bent upward from a left edge portion of the bottom wall portion 62, and a right wall portion 63d bent upward from a right edge portion of the bottom wall portion 62.

The battery module 30 includes a battery module 30A disposed on a front side, and a battery module 30B disposed on a rear side. The battery modules 30A and 30B have a substantially rectangular parallelepiped shape long in the vehicle width direction, and are disposed to face each other in the front-rear direction.

Each of the battery modules 30A and 30B includes a plurality of battery cells 31 stacked in the vehicle width direction. As illustrated in FIG. 2, each battery cell 31 has a substantially rectangular parallelepiped shape which is shortest in the vehicle width direction, and includes a long side which extends in the upper-lower direction and a short side which extends in the front-rear direction when viewed from the vehicle width direction. The battery cells 31 of each of the battery modules 30A and 30B are disposed such that the short sides extend in the front-rear direction and the long sides extend in the upper-lower direction. Since the two battery modules 30A and 30B are disposed such that the short sides are continuous with each other, as compared with a case where the two battery modules 30A and 30B are disposed such that the long sides are continuous with each other, it is possible to prevent an increase in size in the vehicle front-rear direction. The two battery modules 30A and 30B are fixed to the base plate 61 via a left battery module bracket 71 and a right battery module bracket. Illustration of the right battery module bracket is omitted.

The cooling device 40, the junction board 52, and the service plug 53 are disposed on a right side of the battery module 30.

The cooling device 40 includes a fan 41 which blows out the cooling gas for cooling the battery module 30, an introduction duct 42 for introducing the cooling gas into the fan 41, and a delivery duct 43 for delivering the cooling gas blown out from the fan 41 in a desired direction.

The battery control device 51 is disposed at a position facing upper surfaces of the battery modules 30A and 30B so as to straddle the two battery modules 30A and 30B disposed in the front-rear direction in the front-rear direction. The battery control device 51 is supported by a battery control device bracket 72.

The junction board 52 is disposed above the cooling device 40. The junction board 52 is supported by a junction board bracket 73 which extends above the introduction duct 42.

The service plug 53 is provided in a wiring member which electrically connects an external device (not illustrated) and the junction board 52, and is a plug which can be manually inserted and removed. When the service plug 53 is inserted, the external device (not illustrated) and the junction board 52 are electrically connected, and when the service plug 53 is removed, the external device (not illustrated) and the junction board 52 are electrically cut off.

The cover 65 is fixed to the floor panel 10. On a front side of the cover 65, a first opening portion 65a hollowed out along a shape of an introduction port 42a of the introduction duct 42 and a second opening portion 65b provided on a right side of the first opening portion 65a are formed. The cooling gas is introduced from the first opening portion 65a into a housing space 21 of the battery pack 20. A finger or an instrument is inserted into the housing space 21 of the battery pack 20 from the second opening portion 65b, so that the service plug 53 can be inserted and removed.

The vehicle V is provided with the rear seat RS so as to cover the cover 65. That is, the battery pack 20 is mounted below the rear seat RS of the vehicle V.

An intake duct 66 is attached to the cover 65 to take in air in the vehicle cabin CB as the cooling gas for the battery pack 20. The battery pack 20 takes in the air in the vehicle cabin CB from the intake duct 66 as the cooling gas for the battery pack 20, and takes in the air from the first opening portion 65a of the cover 65 into the battery pack 20.

The cooling gas taken in from the first opening portion 65a passes through the introduction duct 42, the fan 41, and the delivery duct 43, and is delivered to a flow path 61a formed between a lower surface of the battery module 30 and the bottom wall portion 62 of the base plate 61. The cooling gas delivered to the flow path 61a flows inside the battery module 30 from a lower side toward an upper side to cool the battery module 30, and is discharged from the upper surface of the battery module 30. The cooling gas discharged from the upper surface of the battery module 30 is discharged from an exhaust port 65c provided on the front side of the cover 65 to an outside of the battery pack 20.

<Gas Discharge Structure Around Battery Module>

The battery pack 20 is provided with the gas discharge structure for discharging gas generated in the battery cells 31 to an outside of the battery case 60, in addition to the above-described cooling flow path. Hereinafter, the gas discharge structure will be described with reference to FIGS. 2 and 4 to 7.

When an internal pressure of the gas generated inside the battery cell 31 becomes high due to some abnormality, the battery cell 31 needs to release the gas to an outside of the battery cell 31 in order to prevent breakage. Therefore, each battery cell 31 is provided with a gas release valve 31a. When the internal pressure of the gas generated in the battery cell 31 increases to a predetermined value or more, the gas release valve 31a opens. In the present embodiment, as illustrated in FIG. 2, the gas release valve 31a of the battery module 30A is disposed on a side opposite to the battery module 30B (front side) in the front-rear direction, and the gas release valve 31a of the battery module 30B is disposed on a side opposite to the battery module 30A (rear side) in the front-rear direction.

In order to discharge the gas released from the gas release valve 31a to the outside of the battery case 60, the battery pack 20 further includes the gas release duct 32, a check valve 33, a flexible tube 34, and a check valve holding portion 35.

The gas release duct 32 is a duct for discharging the gas generated in the battery cell 31 to the outside of the battery case 60. The gas release duct 32 extends in a direction in which the plurality of battery cells 31 are stacked (vehicle width direction), and connects the gas release valves 31a. The gas release duct 32 includes a gas release duct 32A provided in the battery module 30A, and a gas release duct 32B provided in the battery module 30B. As illustrated in FIG. 2, the gas release duct 32A is disposed on the side opposite to the battery module 30B (front side) in the front-rear direction, and the gas release duct 32B is disposed on the side opposite to the battery module 30A (rear side) in the front-rear direction.

The check valve 33 allows a flow of the gas from the gas release valves 31a to the outside of the battery case 60, and restricts entry of a foreign matter from the outside of the battery case 60. Here, the foreign matter is not limited to a solid, and is a concept including a fluid such as a gas or a liquid. As illustrated in FIGS. 4 to 7, the check valve 33 is provided in the battery case 60. More specifically, the check valve 33 is provided between the left wall portion 63c of the base plate 61 and the battery modules 30A and 30B in the housing space 21 surrounded by the cover 65 and the base plate 61, and is not exposed to the outside of the battery case 60. Further, the check valve 33 is disposed between the battery module 30A and the battery module 30B in the front-rear direction.

Figure 7:
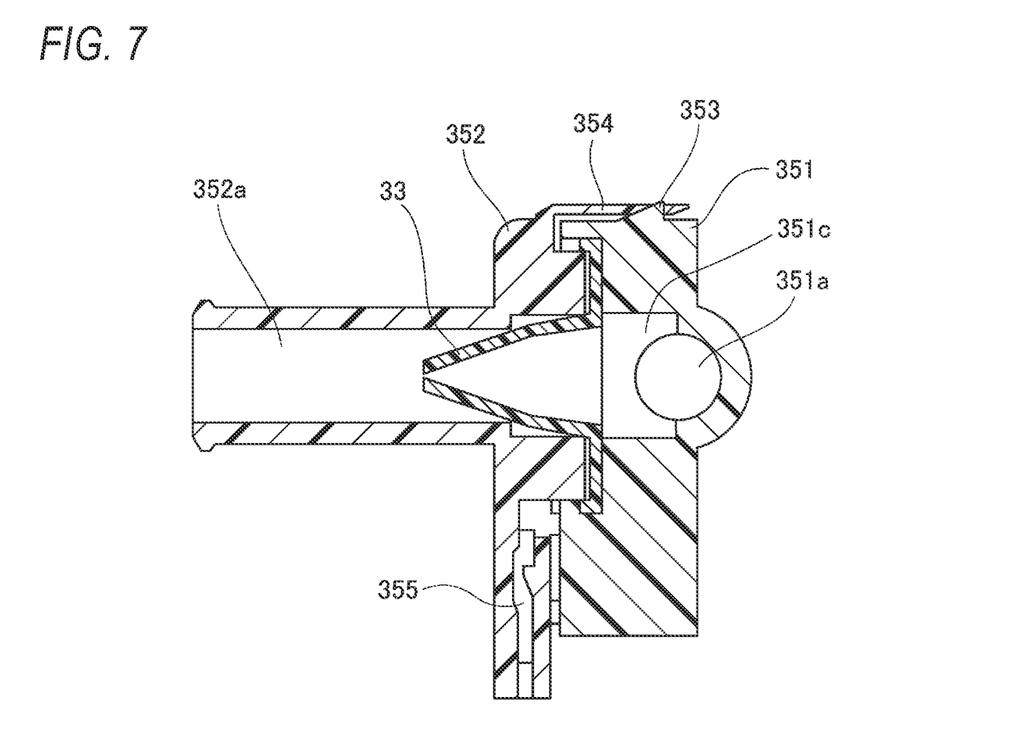
FIG. 7 is a cross-sectional view taken along a cross section VII-VII in FIG. 6.

The check valve 33 is, for example, a duckbill valve as illustrated in FIG. 7, allows a flow of the gas from an upstream side to a downstream side, and cuts off the flow of the gas in an opposite direction. However, the check valve 33 is not limited to the duckbill valve, and may be any valve as long as the check valve 33 allows a flow of the gas in one direction to the outside of the battery case 60 and cuts off the flow of the gas in an opposite direction.

One end of the tube 34 is connected to the gas release duct 32, and the other end of the tube 34 is connected to the outside of the battery case 60. More specifically, the tube 34 includes an upstream tube 34A connected to the gas release duct 32A, an upstream tube 34B connected to the gas release duct 32B, and a downstream tube 34C connected to the outside of the battery case 60. Here, the outside of the battery case 60 is, for example, an inside of the skeleton frame members (a side sill or the like) (not illustrated), or an outside of the vehicle. The upstream tubes 34A and 34B are disposed in the battery case 60. An upstream end portion of the downstream tube 34C is disposed in the battery case 60, and a downstream end portion of the downstream tube 34C is disposed outside the battery case 60. Downstream end portions of the upstream tubes 34A and 34B and the upstream end portion of the downstream tube 34C are connected to one another at a connection portion, and the check valve 33 is provided at the connection portion.

Gas released from the gas release valve 31a flows from the gas release duct 32 to the upstream tubes 34A and 34B, and flows to the downstream tube 34C through the check valve 33. Then, the gas which flows through the downstream tube 34C is discharged to the outside of the battery case 60, for example, the inside of the skeleton frame members.

In this way, in the present embodiment, since the check valve 33 is provided in the battery case 60, a flow path from the gas release valves 31a to the check valve 33 (in the present embodiment, the gas release duct 32 and the upstream tubes 34A and 34B) is protected by the battery case 60. Therefore, it is possible to prevent a foreign matter from entering from the outside into the flow path from the gas release valves 31a to the check valve 33 due to backflow of the foreign matter such as the gas. Further, even if a foreign matter enters from the outside due to breakage or the like of the flow path (in the present embodiment, the downstream tube 34C) disposed on the downstream side of the check valve 33 and exposed to the outside of the battery case 60, the check valve 33 can prevent the foreign matter from entering an inside of the battery cell 31.

The check valve 33 is held by the check valve holding portion 35. A flow path communicating with the upstream tubes 34A and 34B and the downstream tube 34C is formed in the check valve holding portion 35, and the check valve 33 is disposed in the flow path. Here, the check valve holding portion 35 is an example of a connection portion which connects the upstream tube 34A and the upstream tube 34B. Further, the check valve holding portion 35 is an example of a connection portion which connects the upstream tubes 34A and 34B and the downstream tube 34C.

Figure 6:
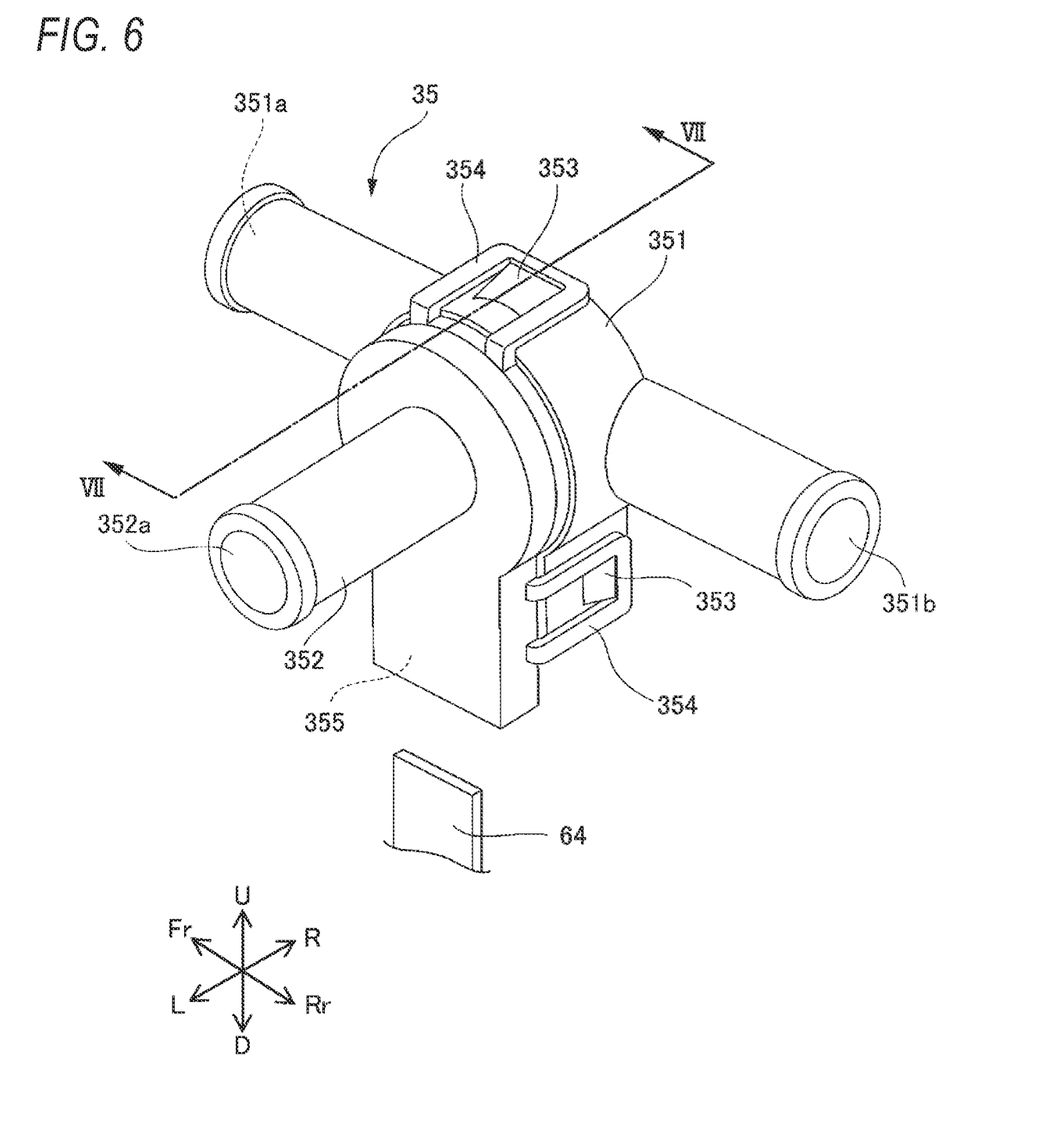
FIG. 6 is an enlarged view illustrating a check valve holding portion 35 in FIG. 4 in an enlarged manner.

More specifically, as illustrated in FIGS. 6 and 7, the check valve holding portion 35 includes an upstream holding portion 351 to which the upstream tubes 34A and 34B are connected, and a downstream holding portion 352 to which the downstream tube 34C is connected. The upstream holding portion 351 extends in a direction in which the two battery modules 30A and 30B are disposed (front-rear direction), and includes a flow path 351a which extends forward and is connected to the upstream tube 34A, a flow path 351b which extends rearward and is connected to the upstream tube 34B, and a merging portion 351c between the flow path 351a and the flow path 351b. The downstream holding portion 352 extends in a direction (vehicle width direction) orthogonal to a direction in which the upstream holding portion 351 extends, and includes a flow path 352a which extends leftward and to which the downstream tube 34C is connected. The merging portion 351c of the upstream holding portion 351 and the flow path 352a of the downstream holding portion 352 communicate with each other, and the check valve 33 is disposed in the flow path 352a.

Engagement claws 353 which protrude from a surface are formed on the upstream holding portion 351 at three locations. Engagement holes 354 which extend toward the upstream holding portion 351 are formed in the downstream holding portion 352 at locations corresponding to the engagement claws 353. The upstream holding portion 351 and the downstream holding portion 352 are fixed by engaging the engagement claws 353 with the engagement holes 354. In the present embodiment, the number of the engagement claws 353 and the number of the engagement holes 354 are respectively three, but the numbers are arbitrary. Further, the upstream holding portion 351 may include the engagement holes 354, and the downstream holding portion 352 may include the engagement claws 353. Furthermore, the engagement between the upstream holding portion 351 and the downstream holding portion 352 is not limited to the engagement between the engagement claws and the engagement holes.

The check valve holding portion 35 is fixed to the base plate 61. More specifically, the base plate 61 includes a stay 64 which extends upward from the bottom wall portion 62, and the stay 64 is inserted into an insertion port 355 which is formed in the downstream holding portion 352 and is open downward. That is, the check valve holding portion 35 is fixed to the base plate 61 by being attached to the stay 64 from above. The insertion port 355 may be formed in the upstream holding portion 351.

Since the check valve holding portion 35 is fixed to the stay 64 of the base plate 61 in this way, a position of the check valve holding portion 35 with respect to the base plate 61 can be easily determined. Further, since the check valve holding portion 35 is attached to the stay 64 from above, movement of the check valve holding portion 35 in a horizontal direction can be restricted.

The check valve holding portion 35 is inserted into the stay 64 from the upper-lower direction, and the upstream tubes 34A and 34B connected to the check valve holding portion 35 are connected to the gas release ducts 32A and 32B from the horizontal direction. That is, the upstream tubes 34A and 34B are connected to the gas release duct 32 from the horizontal direction different from the upper-lower direction in which the check valve holding portion 35 is inserted into the stay 64. Accordingly, when the check valve holding portion 35 is fixed to the base plate 61 from above, the upstream tubes 34A and 34B are unlikely to come off the gas release duct 32.

Although one embodiment of the present disclosure has been described above with reference to the accompanying drawings, it goes without saying that the present disclosure is not limited to such an embodiment. It will be apparent to those skilled in the art that various changes and modifications may be conceived within the scope of the claims. It is also understood that the various changes and modifications belong to the technical scope of the present disclosure. Further, constituent elements in the embodiments described above may be combined freely within a range not departing from a spirit of the disclosure.

For example, in the present embodiment, the battery module 30 is configured with the two battery modules 30A and 30B, but may be configured with one or three or more battery modules 30. Further, the battery module 30 of the present embodiment does not need to be modularized, and may be present as a cell-stacked body in which the plurality of battery cells 31 are stacked in the battery case 60.

In the present embodiment, the flexible tube 34 is provided to discharge the gas from the gas release duct 32 to the outside of the battery case 60, but the tube 34 is not necessarily provided. For example, when the gas release duct 32 extends to the outside of the battery case 60, the check valve 33 may be provided at a position in the gas release duct 32 and in the battery case 60.

In the present embodiment, the check valve holding portion 35 is configured with the upstream holding portion 351 and the downstream holding portion 352, but is not necessarily configured with a plurality of members. As long as the check valve holding portion 35 holds the check valve 33, the check valve holding portion 35 may be configured with a single member.

In the present specification, at least the following matters are described. In the parentheses, the corresponding constituent elements and the like in the above embodiment are shown as an example, and the present disclosure is not limited thereto.

(1) A battery pack (the battery pack 20) includes:
 a cell-stacked body (the battery module 30) in which a plurality of battery cells (the battery cells 31) including gas release valves (the gas release valves 31a) are stacked:
 a gas release duct (the gas release duct 32) which connects the gas release valves of the plurality of battery cells; and
 a battery case (the battery case 60) which accommodates the cell-stacked body and the gas release duct,
 in which the battery pack is capable of discharging a gas from a gas release duct to an outside of the battery case, and
 in which a check valve (the check valve 33) configured to allow a flow of the gas from the gas release valves to the outside of the battery case and to restrict entry of a foreign matter from the outside of the battery case is provided in the battery case.

According to (1), since the check valve is provided in the battery case, a flow path from the gas release valves to the check valve is protected by the battery case. Therefore, it is possible to prevent a foreign matter from entering from the outside into the flow path from the gas release valves to the check valve due to the backflow of the foreign matter such as the gas. Further, even if a foreign matter enters from an outside due to breakage or the like of a flow path exposed to the outside of the battery case, the check valve can prevent the foreign matter from entering an inside of the battery cell.

(2) The battery pack according to (1), further including:
 a tube (the tube 34) connected to the gas release duct, in which the check valve is provided downstream of the gas release duct.

According to (2), since the check valve is provided downstream of the gas release duct and the check valve is provided in the battery case, it is possible to prevent the tube disposed between the check valve and the gas release duct from being damaged.

(3) The battery pack according to (2),
in which the tube includes a first tube (the upstream tubes 34A and 34B) connected to the gas release duct, and a second tube (the downstream tube 34C) connected to the outside of the battery case, and
in which the check valve is provided at a connection portion which connects the first tube and the second tube.

According to (3), the check valve can be disposed using the connection portion which connects the first tube connected to the gas release duct and the second tube connected to the outside of the battery case.

(4) The battery pack according to any one of (1) to (3),
in which the battery case includes a case main body (the base plate 61) on which the cell-stacked body and the gas release duct are disposed, and a cover (the cover 65) which covers the case main body,
in which the check valve is held by a check valve holding portion (the check valve holding portion 35), and
in which the case main body includes a stay (the stay 64) to which the check valve holding portion is fixed.

According to (4), the stay is provided on the case main body on which the cell-stacked body and the gas release duct are disosed, and the check valve holding portion is fixed by the stay. Therefore, a position of the check valve holding portion with respect to the case main body can be easily determined.

(5) The battery pack according to (4),
in which the stay extends upward from a bottom surface of the case main body, and
in which the check valve holding portion is attached to the stay from above.

According to (5), since the check valve holding portion is attached to the stay from above, the check valve holding portion can be easily assembled to the case main body. Further, movement of the check valve holding portion in a horizontal direction can be restricted.

(6) The battery pack according to (5), further including:
a tube (the tube 34) connected to the gas release duct,
in which the check valve holding portion is connected to the tube, and
in which the tube is connected to the gas release duct from a horizontal direction.

According to (6), since the tube is connected to the gas release duct from the horizontal direction different from a direction in which the check valve holding portion is inserted into the stay, when the check valve holding portion is fixed to the case main body, the tube can be unlikely to come off.

(7) A battery pack (the battery pack 20) including:
a first battery module (the battery module 30A) in which a plurality of battery cells (the battery cells 31) including gas release valves (the gas release valves 31a) are stacked along a first direction (the vehicle width direction).
a first gas release duct (the gas release duct 32A) which connects the gas release valves of the plurality of battery cells in the first battery module;
a second battery module (the battery module 30B) in which a plurality of battery cells (the battery cells 31) including gas release valves (the gas release valves 31a) are stacked along the first direction;
a second gas release duct (the gas release duct 32B) which connects the gas release valves of the plurality of battery cells in the second battery module; and
a battery case (the battery case 60) which accommodates the first battery module, the second battery module, the first gas release duct, and the second gas release duct,
in which the battery pack is capable of discharging a gas from the first gas release duct and the second gas release duct to an outside of the battery case, and
in which a check valve (the check valve 33) configured to allow a flow of the gas from the gas release valves to the outside of the battery case and to restrict entry of a foreign matter from the outside of the battery case is provided in the battery case.

According to (7), since the check valve is provided in the battery case, a flow path from the gas release valves to the check valve is protected by the battery case. Therefore, it is possible to prevent a foreign matter from entering from the outside into the flow path from the gas release valves to the check valve due to the backflow of the foreign matter such as the gas. Further, even if a foreign matter enters from an outside due to breakage or the like of a flow path exposed to the outside of the battery case, the check valve can prevent the foreign matter from entering an inside of the battery cell.

(8) The battery pack according to (7), further including:
a first tube (the upstream tube 34A) connected to the first gas release duct;
a second tube (the upstream tube 34A) connected to the second gas release duct; and
a connection portion which connects the first tube and the second tube,
in which the check valve is provided in the connection portion.

According to (8), since the check valve is provided in the connection portion which connects the first tube and the second tube, the two battery modules can share the check valve, and the number of components can be reduced.

(9) The battery pack according to (7) or (8),
in which the first battery module and the second battery module are disposed side by side in a second direction (the front-rear direction) orthogonal to the first direction,
in which the first gas release duct is disposed on a side opposite to the second battery module in the second direction,
in which the second gas release duct is disposed on a side opposite to the first battery module in the second direction, and
in which the check valve is disposed between the first battery module and the second battery module in the second direction.

According to (9), since the check valve is disposed between the first battery module and the second battery module in the second direction, the check valve, the first gas release duct, and the second gas release duct can be disposed in a well-balanced manner.

(10) The battery pack according to (9),
in which in the battery cells of the first battery module and the battery cells of the second battery module, a length in the second direction is smaller than a length in a third direction (the upper-lower direction) orthogonal to the first direction and the second direction.

According to (10), since the two battery modules are disposed such that short sides are continuous with each other, as compared with a case where the two battery modules are disposed such that long sides are continuous with each other, it is possible to prevent an increase in size in a predetermined direction.

The invention claimed is:

1. A battery pack comprising:
a cell-stacked body in which a plurality of battery cells including gas release valves are stacked;
a gas release duct which connects the gas release valves of the plurality of battery cells;
a battery case which accommodates the cell-stacked body and the gas release duct; and
a tube including:
a first tube connected to the gas release duct; and
a second tube connected to an outside of the battery case,
wherein the battery pack is capable of discharging a gas from the gas release duct to the outside of the battery case,
wherein a check valve configured to allow a flow of the gas from the gas release valves to the outside of the battery case and to restrict entry of a foreign matter from the outside of the battery case is provided in the battery case,
wherein the check valve is provided downstream of the gas release duct and provided at a connection portion which connects the first tube and the second tube,
wherein the battery case includes a case main body on which the cell-stacked body and the gas release duct are disposed, and a cover which covers the case main body,
wherein the check valve is held by a check valve holding portion,
wherein the case main body includes a stay to which the check valve holding portion is fixed,
wherein the stay extends upward from a bottom surface of the case main body,
wherein the check valve holding portion is attached to the stay from above,
wherein the check valve holding portion is connected to the tube including the first tube and the second tube, and
wherein the tube including the first tube and the second tube is connected to the gas release duct from a horizontal direction.

2. A battery pack comprising:
a first battery module in which a plurality of battery cells including gas release valves are stacked along a first direction;
a first gas release duct which connects the gas release valves of the plurality of battery cells in the first battery module;
a second battery module in which a plurality of battery cells including gas release valves are stacked along the first direction;
a second gas release duct which connects the gas release valves of the plurality of battery cells in the second battery module;
a battery case which accommodates the first battery module, the second battery module, the first gas release duct, and the second gas release duct;
a first tube connected to the first gas release duct;
a second tube connected to the second gas release duct; and
a connection portion which connects the first tube and the second tube,
wherein the battery pack is capable of discharging a gas from the first gas release duct and the second gas release duct to an outside of the battery case,
wherein a check valve configured to allow a flow of the gas from the gas release valves to the outside of the battery case and to restrict entry of a foreign matter from the outside of the battery case is provided in the battery case,
wherein the check valve is provided in the connection portion,
wherein the battery case includes a case main body on which the cell-stacked body, the first gas release duct, and the second gas release duct are disposed, and a cover which covers the case main body,
wherein the check valve is held by a check valve holding portion,
wherein the case main body includes a stay to which the check valve holding portion is fixed,
wherein the stay extends upward from a bottom surface of the case main body,
wherein the check valve holding portion is attached to the stay from above,
wherein the check valve holding portion is connected to the first tube and the second tube, and
wherein the first tube and the second tube are connected to the first gas release duct and the second gas release duct from a horizontal direction.

3. A battery pack comprising:
a first battery module in which a plurality of battery cells including gas release valves are stacked along a first direction;
a first gas release duct which connects the gas release valves of the plurality of battery cells in the first battery module;
a second battery module in which a plurality of battery cells including gas release valves are stacked along the first direction;
a second gas release duct which connects the gas release valves of the plurality of battery cells in the second battery module; and
a battery case which accommodates the first battery module, the second battery module, the first gas release duct, and the second gas release duct,
wherein the battery pack is capable of discharging a gas from the first gas release duct and the second gas release duct to an outside of the battery case,
wherein a check valve configured to allow a flow of the gas from the gas release valves to the outside of the battery case and to restrict entry of a foreign matter from the outside of the battery case is provided in the battery case,
wherein the first battery module and the second battery module are disposed side by side in a second direction orthogonal to the first direction,
wherein the first gas release duct is disposed on a side opposite to the second battery module in the second direction,
wherein the second gas release duct is disposed on a side opposite to the first battery module in the second direction,
wherein the check valve is disposed between the first battery module and the second battery module in the second direction,
wherein the battery case includes a case main body on which the cell-stacked body, the first gas release duct, and the second gas release duct are disposed, and a cover which covers the case main body,
wherein the check valve is held by a check valve holding portion, wherein the case main body includes a stay to which the check valve holding portion is fixed, wherein the stay extends upward from a bottom surface of the case main body, wherein the check valve holding portion is attached to the stay from above, wherein the check valve holding portion is connected to a tube including a first tube connected to the first gas release duct and a second tube connected to the second gas release duct, and wherein the tube including the first tube and the second tube is connected to the first gas release duct and the second gas release duct from a horizontal direction.

4. The battery pack according to claim 3, wherein each battery cell of the plurality of battery cells of the first battery module and each battery cell of the plurality of battery cells of the second battery module have a length in the second direction which is smaller than a length in a third direction orthogonal to the first direction and the second direction.

* * * * *